(12) United States Patent
Lu

(10) Patent No.: US 11,683,257 B1
(45) Date of Patent: Jun. 20, 2023

(54) METHOD AND DEVICE FOR IMPROVING LINK AGGREGATION PROTOCOL TIMEOUT

(71) Applicant: INSPUR SUZHOU INTELLIGENT TECHNOLOGY CO., LTD., Jiangsu (CN)

(72) Inventor: Yancheng Lu, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/012,928

(22) PCT Filed: Jun. 29, 2021

(86) PCT No.: PCT/CN2021/103319
§ 371 (c)(1),
(2) Date: Dec. 25, 2022

(87) PCT Pub. No.: WO2022/048281
PCT Pub. Date: Mar. 10, 2022

(30) Foreign Application Priority Data

Sep. 4, 2020 (CN) .......................... 202010921798.9

(51) Int. Cl.
*H04L 43/16* (2022.01)
*H04L 41/0604* (2022.01)
*H04L 43/0817* (2022.01)

(52) U.S. Cl.
CPC .......... *H04L 43/16* (2013.01); *H04L 41/0627* (2013.01); *H04L 43/0817* (2013.01)

(58) Field of Classification Search
CPC .. H04L 43/16; H04L 41/0627; H04L 43/0817
See application file for complete search history.

(56) References Cited

U.S. PATENT DOCUMENTS

| | | | | |
|---|---|---|---|---|
| 2011/0211585 A1* | 9/2011 | Kodaka | ................. | H04L 45/00 370/401 |
| 2015/0281127 A1 | 10/2015 | Liu et al. | | |

(Continued)

FOREIGN PATENT DOCUMENTS

| | | |
|---|---|---|
| CN | 101094157 A | 12/2007 |
| CN | 101945042 A | 1/2011 |

(Continued)

OTHER PUBLICATIONS

PCT/CN2021/103319 international search report.

*Primary Examiner* — Philip C Lee
(74) *Attorney, Agent, or Firm* — IPro, PLLC

(57) ABSTRACT

The present disclosure is to propose a method and device for improving a link aggregation protocol timeout. method for improving a link aggregation timeout. The method includes the following steps: setting a timeout value and a timeout threshold count of link aggregation control protocol data unit (LACPDU) packet reception of a switch; obtaining a timeout count statistically, in response to a timeout of reception of a link aggregation control protocol data unit (LACPDU) packet from a second switch by a first switch; determining, through a network controller, in response to that the timeout count is greater than the timeout threshold count and that an aggregated link between the switches is in an out-of-band management mode, whether a port of the second switch is abnormal; and removing, in response to the port of the second switch being abnormal, the abnormal port of the second switch from the aggregated link.

20 Claims, 3 Drawing Sheets

(56) References Cited

U.S. PATENT DOCUMENTS

2016/0344617 A1* 11/2016 Gopalarathnam ...... H04L 45/22
2018/0026872 A1*  1/2018 Manthiramoorthy .........................
                                                    H04L 12/437
                                                         370/249
2018/0176036 A1   6/2018 Butcher et al.

FOREIGN PATENT DOCUMENTS

| CN | 103188172 A |  7/2013 |
| CN | 104219075 A | 12/2014 |
| CN | 104917624 A |  9/2015 |
| CN | 112134797 A | 12/2020 |

* cited by examiner

METHOD AND DEVICE FOR IMPROVING LINK AGGREGATION PROTOCOL TIMEOUT

CROSS-REFERENCE TO RELATED APPLICATIONS

The present disclosure claims the priority of the Chinese patent application filed on Sep. 4, 2020 before the CNIPA, China National Intellectual Property Administration with the application number of 202010921798.9 and the title of "METHOD AND DEVICE FOR IMPROVING LINK AGGREGATION PROTOCOL TIMEOUT", which is incorporated herein in its entirety by reference.

FIELD

The present disclosure relates to the field of computers, and more particularly to a method and device for improving a link aggregation protocol timeout.

BACKGROUND

Out-of-band management refers to maintaining devices using separate management channels. It allows system managers to remotely monitor and manage servers, routers, network switches, and other network devices. In contrast, in-band management refers to managing devices using general data channels. The obvious limitation of in-band management is its vulnerability to attacks or damages to managed devices. Out-of-band management breaks this limitation by deploying management channels physically isolated from data channels.

Link aggregation refers to aggregating a plurality of physical ports into a logical port, so as to implement load sharing of outbound and inbound traffic throughputs at each member port, and a switch determines, according to a port load sharing policy configured by a user, the member port from which a network packet is to be sent to a peer switch. When determining a link failure of one of the member ports, the switch stops sending packets through the port, and recalculates the ports in the remaining links for sending messages according to the load sharing policy, and the failing port serves as a transceiver port again after recovered.

As a protocol capable of dynamically forming an aggregated link between switches, link aggregation control protocol (LACP) implements regular exchange of link aggregation control protocol data units (LACPDUs) through two machines. The switch may know about an aggregated link setting of the peer switch and match a proper configuration, and may also know whether the peer switch operates normally. Currently, an aggregated link is usually established using the LACP, and after the link is established, LACPDU packets are continuously sent over this link. In practical applications, there is the following common problem: the number of packets that may be sent to a central processing unit (CPU) through a port per second is limited to avoid the CPU being overloaded; LACPDU packets are required to be sent to the CPU for processing, and if a network state is not stable, for example, there is a broadcast storm or a loop, too many packets may be required to be sent to the CPU through the port for processing, for example address resolution protocol (ARP) packets, and then the LACPDU packets are very likely to be crowded out; and as a result, the port is misjudged and removed from the aggregated link, and ports on the aggregated link are unstable.

SUMMARY

In view of this, an object of embodiments of the present disclosure is to propose a method and device for improving a link aggregation protocol timeout. By the method of the present disclosure, the problem that the stability of in-band management may be affected by an in-band data flow may be solved, the stability of an aggregated link may further be improved, and the forward compatibility is retained.

Based on the above object, an aspect of the embodiments of the present disclosure provides a method for improving a link aggregation protocol timeout, including the following steps:

setting a timeout value and a timeout threshold count of LACPDU packet reception of a switch;

obtaining a timeout count statistically, in response to a timeout of reception of an LACPDU packet from a second switch by a first switch;

determining, through a network controller, in response to that the timeout count is greater than the timeout threshold count and that an aggregated link between the switches is in an out-of-band management mode, whether a port of the second switch is abnormal; and removing, in response to the port of the second switch being abnormal, the abnormal port of the second switch from the aggregated link.

According to an embodiment of the present disclosure, the determining, through a network controller, in response to that the timeout count is greater than the timeout threshold count and that an aggregated link between the switches is in an out-of-band management mode, whether a port of the second switch is abnormal, includes:

submitting, by the first switch, in response to the timeout count being greater than the timeout threshold count, a request of querying a state of the port of the second switch;

obtaining, by the network controller, in response to that the request is received by the network controller, the state of the port of the second switch, and determining whether the state of the port of the second switch is abnormal; and sending, by the network controller, a determining result of whether the state is abnormal to the first switch.

According to an embodiment of the present disclosure, the setting a timeout value and a timeout threshold count of LACPDU packet reception of a switch includes:

setting a threshold time for LACPDU packet reception; and in response to time for receiving an LACPDU packet being greater than the threshold time, determining one timeout, and restarting counting.

According to an embodiment of the present disclosure, the timeout threshold count is three.

According to an embodiment of the present disclosure, the method further includes: modifying a field of a reserved block of the LACPDU packet, so as to switch whether the aggregated link of the switch supports the out-of-band management mode.

Another aspect of the embodiments of the present disclosure also provides a device for improving a link aggregation protocol timeout, including:

a setting module, configured to set a timeout value and a timeout threshold count of LACPDU reception of a switch;

a statistical module, configured to obtain a timeout count statistically, in response to a timeout of reception of an LACPDU from a second switch by a first switch;

a determining module, configured to determine, through a network controller, in response to that the timeout count is greater than the timeout threshold count and that an aggregated link between the switches is in an out-of-band management mode, whether a port of the second switch is abnormal; and a removing module, configured to remove, in response to the port of the second switch being abnormal, the abnormal port of the second switch from the aggregated link.

According to an embodiment of the present disclosure, the determining module is further configured to:

make the first switch submit, in response to the timeout count being greater than the timeout threshold count, a request of querying a state of the port of the second switch;

make the network controller obtain, in response to that the request is received by the network controller, the state of the port of the second switch, and determine whether the state of the port of the second switch is abnormal; and make the network controller send, a determining result of whether the state is abnormal to the first switch.

According to an embodiment of the present disclosure, the setting module is further configured to:

set a threshold time for link aggregation control protocol data unit (LACPDU) packet reception; and in response to time for receiving a link aggregation control protocol data unit (LACPDU) packet being greater than the threshold time, determine one timeout, and restart counting.

According to an embodiment of the present disclosure, the timeout threshold count is three.

According to an embodiment of the present disclosure, the device further including a modification module, configured to modify a field of a reserved block of the link aggregation control protocol data unit (LACPDU) packet, so as to switch whether the aggregated link of the switch supports the out-of-band management mode.

The present application also provides a device for improving a link aggregation timeout, including:

a memory, configured to store a computer program;

a processor, configured to execute the computer program to implement operations for improving a link aggregation timeout as described above.

In addition, the present application also provides a computer-readable storage medium, storing a computer program that is executed by a processor to implement operations for improving a link aggregation timeout as described above.

The present disclosure has the following beneficial technical effects. In the method for improving a link aggregation protocol timeout provided in the embodiments of the present disclosure, a timeout value and a timeout threshold count of LACPDU packet reception of a switch are set; a timeout count is obtained statistically in response to a timeout of reception of an LACPDU packet from a second switch by a first switch; a network controller determines, in response to that the timeout count is greater than the timeout threshold count and that an aggregated link between the switches is in an out-of-band management mode, whether a port of the second switch is abnormal; and in response to the port of the second switch being abnormal, the abnormal port of the second switch is removed from the aggregated link. By this technical solution, the problem that the stability of in-band management may be affected by an in-band data flow may be solved, the stability of an aggregated link may further be improved, and the forward compatibility is retained.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those of ordinary skill in the art may further obtain other embodiments according to these drawings without creative work.

DETAILED DESCRIPTION OF THE EMBODIMENTS

In order to make the object, technical solutions, and advantages of the present disclosure clearer, the embodiments of the present disclosure will further be described below in detail in combination with specific embodiments and with reference to the drawings.

Figure 1:
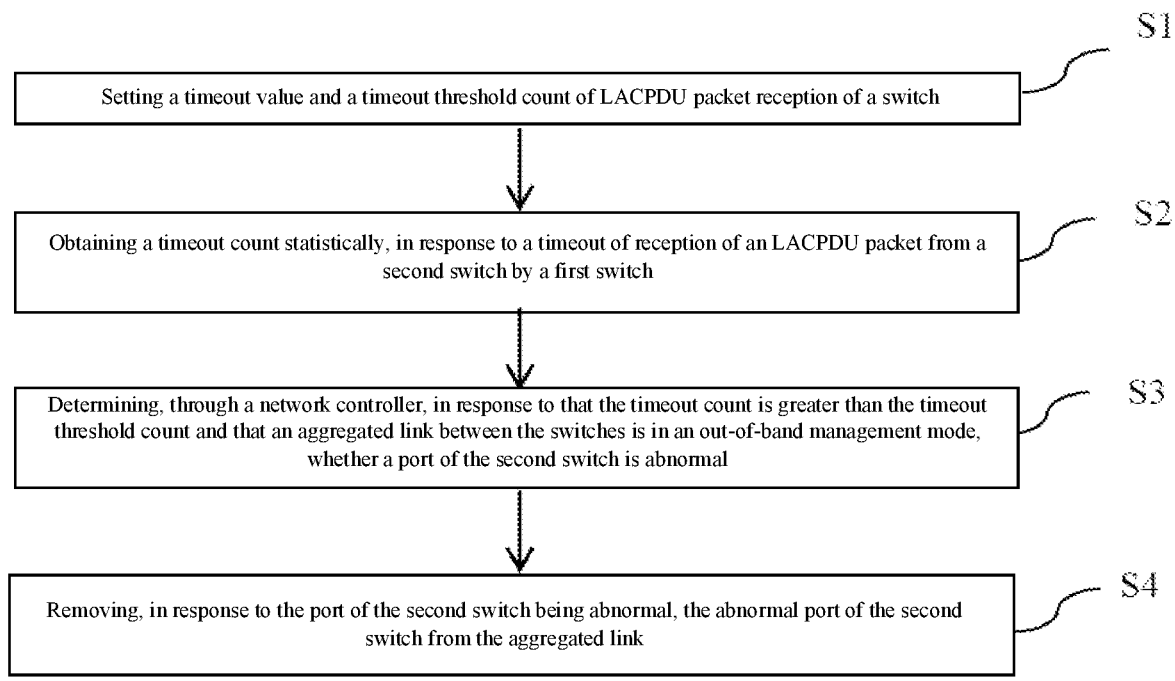
FIG. 1 is a schematic flowchart of a method for improving a link aggregation protocol timeout according to an embodiment of the present disclosure.

Based on the above object, a first aspect of the embodiments of the present disclosure proposes an embodiment of a method for improving a link aggregation protocol timeout. FIG. 1 is a schematic flowchart of the method.

As shown in FIG. 1, the method may include the following steps.

In S1, setting a timeout value and a timeout threshold count of LACPDU packet reception of a switch. According to standard IEEE802.3ad, a user may set a long interval (thirty seconds) or a short interval (one second) to send LACPDU packets.

In S2, obtaining a timeout count statistically in response to a timeout of reception of an LACPDU from a second switch by a first switch.

In S3, determines, through a network controller, in response to that the timeout count is greater than the timeout threshold count and that an aggregated link between the switches is in an out-of-band management mode, whether a port of the second switch is abnormal. Generally, a data center has a network controller configured to monitor all network devices of the data center, and an aggregated link state monitoring and control module may be added in the controller, such that a switch may query an aggregated link state of a peer switch through the controller to avoid the aggregated link state being affected by an in-band data flow.

In S4, removing, in response to the port of the second switch being abnormal, the abnormal port of the second switch from the aggregated link. After determining that the port of the second switch is abnormal, the network controller may regularly monitor the abnormal port, and when a state of the abnormal port is normal, add the port to the aggregated link again.

By the technical solution of the present disclosure, the problem that the stability of in-band management may be affected by an in-band data flow may be solved, the stability of an aggregated link may further be improved, and the forward compatibility is retained.

In an embodiment of the present disclosure, the step of determining, through a network controller, in response to that the timeout count is greater than the timeout threshold count and that an aggregated link between the switches is in an out-of-band management mode, whether a port of the second switch is abnormal, includes the following steps:

the first switch submits, in response to the timeout count being greater than the timeout threshold count, a request of querying a state of the port of the second switch;

in response to that the request is received by the network controller, the network controller obtains the state of the port of the second switch, and determines whether the state of the port of the second switch is abnormal; and the network controller sends a determining result of whether the state is abnormal to the first switch. When the timeout count of LACPDU packet reception of the first switch reaches three, the first switch submits a request of querying the aggregated link of the second switch to the aggregated link state monitoring and control module of the controller. Then, the aggregated link state monitoring and control module confirms a link state table in a database. If information in the table expires, the aggregated link state monitoring and control module sends a state request to the second switch. After the second switch transmits a link state back to the aggregated link state monitoring and control module, and then the aggregated link state monitoring and control module transmits a query result back to the first switch. Then, the first switch determines whether the port is required to be disabled according to the link state of peer switch.

In an embodiment of the present disclosure, the step of setting a timeout value and a timeout threshold count of LACPDU reception of a switch, includes the following steps:

a threshold time for LACPDU packet reception is set; and in response to time for receiving an LACPDU packet being greater than the threshold time, one timeout is determined, and counting is restarted.

In an embodiment of the present disclosure, the timeout threshold count is three.

In an embodiment of the present disclosure, the method further includes: modifying a field of a reserved block of the LACPDU packet, so as to switch whether the aggregated link of the switch supports the out-of-band management mode. It is the reserved block where an LACP field may be modified. In the standards, totally fifty bytes are reserved in this block for function extension, so modifying this field may not affect existing functions. The first bit of the first byte is used to determine whether the out-of-band management is supported, where 1 represents out-of-band management, and 0 represents in-band management. Therefore, forward compatibility with old devices that do not support this technology may be achieved. If the reserved block in the received LACPDU packet is not modified, the aggregated link state continues to be maintained by in-band management.

By the technical solution of the present disclosure, the problem that the stability of in-band management may be affected by an in-band data flow may be solved, the stability of an aggregated link may further be improved, and the forward compatibility is retained.

It is to be noted that those of ordinary skill in the art may understand that all or part of the flows in the method of the above-mentioned embodiment may be completed by a computer program instructing related hardware. The above program may be stored in a computer-readable storage medium. When the program is executed, the flows of the embodiments of the respective methods may be included. The storage medium may be a magnetic disk, an optical disk, a read-only memory (ROM), a random access memory (RAM), or the like. The embodiment of the computer program may have effects the same as or similar to those in any corresponding method embodiment.

In addition, the methods disclosed according to the embodiments of the present disclosure may also be implemented as a computer program executed by a CPU. The computer program may be stored in a computer-readable storage medium. When the computer program is executed by the CPU, the above functions defined in the methods disclosed in the embodiments of the present disclosure are executed.

Figure 2:
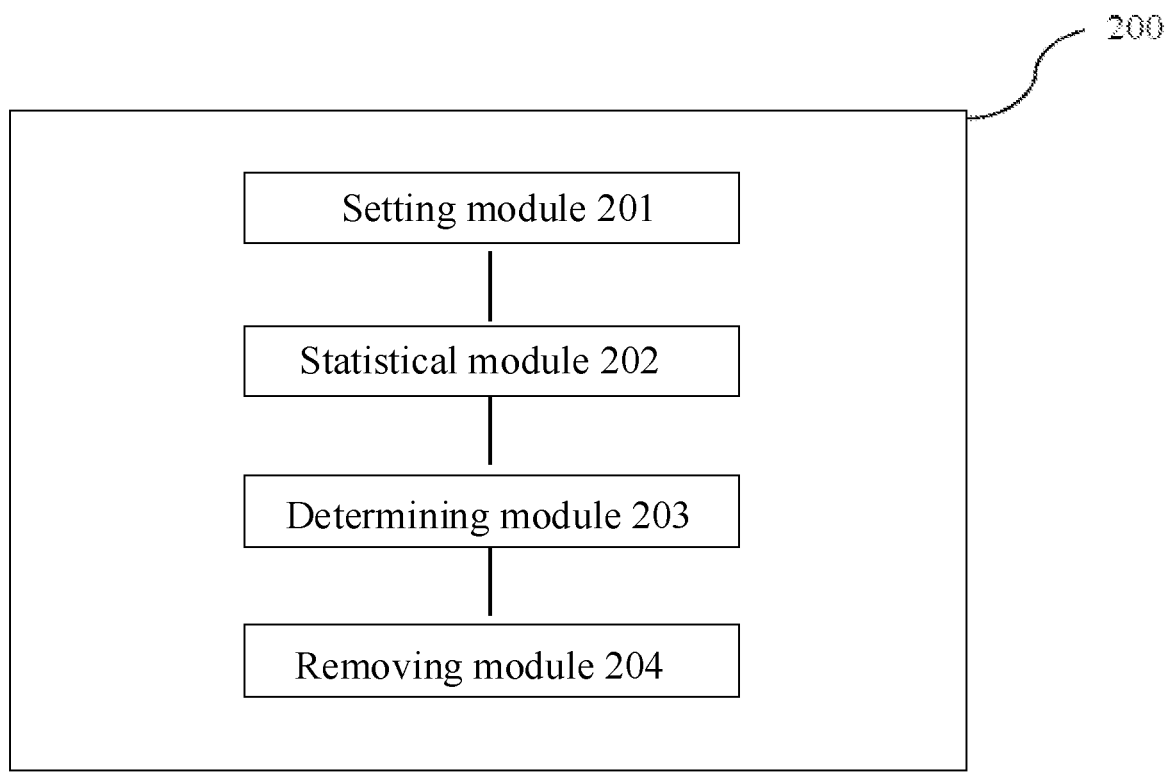
FIG. 2 is a schematic diagram of a device for improving a link aggregation protocol timeout according to an embodiment of the present disclosure.

Based on the above object, a second aspect of the embodiments of the present disclosure proposes a device for improving a link aggregation protocol timeout. As shown in FIG. 2, the device 200 includes:

a setting module 201, configured to set a timeout value and a timeout threshold count of LACPDU reception of a switch;

a statistical module 202, configured to obtain a timeout count statistically in response to a timeout of reception of an LACPDU from a second switch by a first switch;

a determining module 203, configured to determine, through a network controller, in response to that the timeout count is greater than the timeout threshold count and that an aggregated link between the switches is in an out-of-band management mode, whether a port of the second switch is abnormal; and a removing module 204, configured to remove, in response to the port of the second switch being abnormal, the abnormal port of the second switch from the aggregated link.

In an embodiment of the present disclosure, the determining module is further configured to:

make the first switch submit, in response to the timeout count being greater than the timeout threshold count, a request of querying a state of the port of the second switch;

make the network controller, in response to that the request is received by the network controller, obtain the state of the port of the second switch, and determine whether the state of the port of the second switch is abnormal; and make the network controller send, a determining result of whether the state is abnormal to the first switch.

In an embodiment of the present disclosure, the setting module is further configured to:

set a threshold time for LACPDU packet reception; and in response to time for receiving an LACPDU packet being greater than the threshold time, determine one timeout, and restart counting.

In an embodiment of the present disclosure, the timeout threshold count is three.

Figure 3:
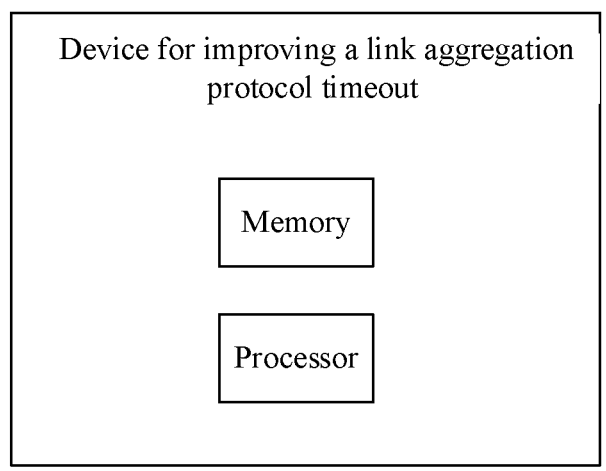
FIG. 3 is a schematic diagram illustrating a device for improving a link aggregation protocol timeout according to an embodiment of the present disclosure.

In an embodiment of the present disclosure, the device further includes a modification module, configured to modify a field of a reserved block of the LACPDU packet, so as to switch whether the aggregated link of the switch supports the out-of-band management mode. Based on the above object, as shown in FIG. 3, a third aspect of the embodiments of the present disclosure proposes a device for improving a link aggregation protocol timeout. The device includes a processor and a memory, the memory contains instructions therein executable by the processor, wherein, in response to that the instructions are executed by the processor, the processor is configured to implement the method according to the embodiments above.

The above embodiments, especially any "preferred" embodiments, are possible examples of implementation, and are proposed only for a clear understanding of the principles of the present disclosure. Many changes and modifications may be made to the above embodiments without departing from the spirit and principles of the techniques described herein, all of which are intended to be included in the scope of the present disclosure and protected by the appended claims.

The invention claimed is:

1. A method for improving a link aggregation timeout, comprising following steps:
   setting a timeout value and a timeout threshold count of link aggregation control protocol data unit packet reception;
   obtaining a timeout count statistically, in response to a timeout of reception of a link aggregation control protocol data unit packet from a second switch by a first switch;
   determining, through a network controller, in response to that the timeout count is greater than the timeout threshold count and that an aggregated link between the first switch and the second switch is in an out-of-band management mode, whether a port of the second switch is abnormal; and
   removing, in response to the port of the second switch being abnormal, the abnormal port of the second switch from the aggregated link.

2. The method according to claim 1, wherein the determining, through a network controller, in response to that the timeout count is greater than the timeout threshold count and that an aggregated link between the first switch and the second switch is in an out-of-band management mode, whether a port of the second switch is abnormal, comprises:
   submitting, by the first switch, in response to the timeout count being greater than the timeout threshold count, a request of querying a state of the port of the second switch;
   obtaining, by the network controller, in response to that the request is received by the network controller, the state of the port of the second switch, and determining whether the state of the port of the second switch is abnormal; and
   sending, by the network controller, a determining result of whether the state is abnormal to the first switch.

3. The method according to claim 1, wherein the setting a timeout value and a timeout threshold count of link aggregation control protocol data unit packet reception, comprises:
   setting a threshold time for link aggregation control protocol data unit packet reception; and
   in response to time for receiving a link aggregation control protocol data unit packet being greater than the threshold time, determining one timeout, and restarting counting.

4. The method according to claim 1, wherein the timeout threshold count is three.

5. The method according to claim 1, further comprising: modifying a field of a reserved block of the link aggregation control protocol data unit packet, so as to switch whether the aggregated link of a switch supports the out-of-band management mode.

6. A device for improving a link aggregation timeout, comprising:
   a processor; and
   a memory, containing instructions therein executable by the processor, wherein, in response to that the instructions are executed by the processor, the processor is configured to:
   set a timeout value and a timeout threshold count of link aggregation control protocol data unit reception;
   obtain a timeout count statistically, in response to a timeout of reception of a link aggregation control protocol data unit from a second switch by a first switch;
   determine, through a network controller, in response to that the timeout count is greater than the timeout threshold count and that an aggregated link between the first switch and the second switch is in an out-of-band management mode, whether a port of the second switch is abnormal; and
   remove, in response to the port of the second switch being abnormal, the abnormal port of the second switch from the aggregated link.

7. The device according to claim 6, wherein the processor is further configured to:
   make the first switch submit, in response to the timeout count being greater than the timeout threshold count, a request of querying a state of the port of the second switch;
   make the network controller obtain, in response to that the request is received by the network controller, the state of the port of the second switch, and determine whether the state of the port of the second switch is abnormal; and
   make the network controller send, a determining result of whether the state is abnormal to the first switch.

8. The device according to claim 6, wherein the processor is further configured to:
   set a threshold time for link aggregation control protocol data unit packet reception; and
   in response to time for receiving a link aggregation control protocol data unit packet being greater than the threshold time, determine one timeout, and restart counting.

9. The device according to claim 6, wherein the timeout threshold count is three.

10. The device according to claim 6, wherein the processor is further configured to modify a field of a reserved block of the link aggregation control protocol data unit packet, so as to switch whether the aggregated link of a switch supports the out-of-band management mode.

11. The method according to claim 1, wherein the setting a timeout value and a timeout threshold count of link aggregation control protocol data unit packet reception, comprises:
    setting an interval of thirty seconds or one second to send the link aggregation control protocol data unit packet.

12. The method according to claim 2, wherein the determining, through a network controller, in response to that the timeout count is greater than the timeout threshold count and that an aggregated link between the first switch and the second switch is in an out-of-band management mode, whether a port of the second switch is abnormal, comprises:
    adding an aggregated link state monitoring and control module in the network controller; and
    submitting, by the first switch, the request of querying the state of the port of the second switch to aggregated link state monitoring and control module.

13. The method according to claim 12, wherein, in response to that the first switch submits the request of querying the state of the port of the second switch to aggregated link state monitoring and control module, the aggregated link state monitoring and control module confirms a link state table in a database.

14. The method according to claim 13, wherein, in response to that information in the table expires, the aggregated link state monitoring and control module sends the request of querying the state of the port of the second switch to the second switch.

15. The method according to claim 5, wherein, the modifying a field of a reserved block of the link aggregation control protocol data unit packet, so as to switch whether the aggregated link of a switch supports the out-of-band management mode, comprises:
    using a first bit of a first byte to determine whether the out-of-band management is supported, where 1 represents the out-of-band management mode, and 0 represents an in-band management mode.

16. The device according to claim 6, wherein the processor is further configured to:
    set an interval of thirty seconds or one second to send the link aggregation control protocol data unit packet.

17. The device according to claim 7, wherein the processor is further configured to:
    add an aggregated link state monitoring and control module in the network controller; and
    submit, by the first switch, the request of querying the state of the port of the second switch to aggregated link state monitoring and control module.

18. The device according to claim 17, wherein, in response to that the first switch submits the request of querying the state of the port of the second switch to aggregated link state monitoring and control module, the aggregated link state monitoring and control module confirms a link state table in a database.

19. The device according to claim 10, wherein, the processor is further configured to:
    use a first bit of a first byte to determine whether the out-of-band management is supported, where 1 represents the out-of-band management mode, and 0 represents an in-band management mode.

20. A non-transitory storage medium, containing instructions thereon, wherein, in response to that the instructions are executed by a processor, the processor implements operations according to claim 1.

* * * * *